(12) United States Patent
Strong et al.

(10) Patent No.: US 10,984,439 B2
(45) Date of Patent: Apr. 20, 2021

(54) METHOD AND SYSTEM TO ACCOUNT FOR TIMING AND QUANTITY PURCHASED IN ATTRIBUTION MODELS IN ADVERTISING

(71) Applicant: STARCOM MEDIAVEST GROUP, Chicago, IL (US)

(72) Inventors: Christopher Michael Strong, Winfield, IL (US); Sophia Dorothy Sullivan, Chicago, IL (US)

(73) Assignee: STARCOM MEDIAVEST GROUP, Chicago, IL (US)

( * ) Notice: Subject to any disclaimer, the term of this patent is extended or adjusted under 35 U.S.C. 154(b) by 21 days.

(21) Appl. No.: 15/684,761

(22) Filed: Aug. 23, 2017

(65) Prior Publication Data
US 2019/0066149 A1 Feb. 28, 2019

(51) Int. Cl.
*G06Q 30/02* (2012.01)
*G06N 20/00* (2019.01)

(52) U.S. Cl.
CPC ......... *G06Q 30/0242* (2013.01); *G06N 20/00* (2019.01)

(58) Field of Classification Search
CPC . G06Q 30/0207–0277; G06Q 30/0242; G06N 20/00
See application file for complete search history.

(56) References Cited

U.S. PATENT DOCUMENTS

| | | | |
|---|---|---|---|
| 7,340,408 B1* | 3/2008 | Drew | G06Q 30/02 705/7.33 |
| 8,768,770 B2* | 7/2014 | Kitts | G06Q 30/0242 705/14.52 |
| 2003/0149603 A1* | 8/2003 | Ferguson | G06Q 20/382 705/64 |
| 2004/0019516 A1* | 1/2004 | Puskorius | G06Q 10/06 705/7.31 |
| 2005/0189415 A1* | 9/2005 | Fano | G06Q 30/0251 235/383 |
| 2006/0161403 A1* | 7/2006 | Jiang | G06N 20/00 703/2 |
| 2008/0103902 A1* | 5/2008 | Burdick | G06Q 30/0244 705/14.43 |
| 2008/0270363 A1* | 10/2008 | Hunt | G06F 17/30489 |

(Continued)

FOREIGN PATENT DOCUMENTS

WO WO 2008/092149 A2 * 7/2008 ............. G06Q 10/06

OTHER PUBLICATIONS

Multivariate Arrival Times with Recurrent Neural Networks for Personalized Demand Forecasting, Chen et al., 2018 IEEE International Conference on Data Mining Workshops (ICDMW).*

(Continued)

*Primary Examiner* — David J Stoltenberg
(74) *Attorney, Agent, or Firm* — Baker & McKenzie

(57) ABSTRACT

Within the field of advertising, a data-driven solution is proposed that enables attribution to use a two-stage model, to account for (1) the timing of a purchase occasion, and (2) a prediction of the quantity purchased. This allows for an accurate forecast of quantity purchased, which is meaningful to media teams and advertisers. Attribution is the process of assigning credit to marketing activities for their contribution towards driving a desired marketing result.

13 Claims, 8 Drawing Sheets

(56) References Cited

U.S. PATENT DOCUMENTS

| | | | | |
|---|---|---|---|---|
| 2008/0288889 A1* | 11/2008 | Hunt | G06Q 30/02 | 715/810 |
| 2008/0319829 A1* | 12/2008 | Hunt | G06Q 30/02 | 705/7.29 |
| 2009/0018996 A1* | 1/2009 | Hunt | G06Q 30/02 | |
| 2009/0132347 A1* | 5/2009 | Anderson | G06Q 30/02 | 705/14.52 |
| 2010/0235219 A1* | 9/2010 | Merrick | G06Q 10/0639 | 705/7.38 |
| 2010/0274663 A1* | 10/2010 | Hinton | G06Q 30/0246 | 705/14.43 |
| 2011/0208569 A1* | 8/2011 | Fano | G06Q 30/0255 | 705/14.1 |
| 2012/0158624 A1* | 6/2012 | Lingenfelder | G06F 17/18 | 706/12 |
| 2012/0284213 A1* | 11/2012 | Lin | G06N 20/00 | 706/12 |
| 2012/0290371 A1* | 11/2012 | Crites | G06Q 30/02 | 705/14.4 |
| 2013/0124302 A1* | 5/2013 | Briggs | G06Q 30/0242 | 705/14.44 |
| 2013/0332264 A1* | 12/2013 | Chittilappilly | G06Q 30/02 | 705/14.45 |
| 2014/0046777 A1* | 2/2014 | Markey | G06Q 30/0269 | 705/14.66 |
| 2014/0067518 A1* | 3/2014 | McGovern | G06Q 30/0242 | 705/14.41 |
| 2014/0114741 A1* | 4/2014 | Genc-Kaya | G06Q 30/0247 | 705/14.41 |
| 2014/0236705 A1* | 8/2014 | Shao | G06Q 30/0242 | 705/14.41 |
| 2014/0324521 A1* | 10/2014 | Mun | G06Q 10/04 | 705/7.28 |
| 2015/0186925 A1* | 7/2015 | Chittilappilly | G06Q 30/0243 | 705/14.41 |
| 2015/0262077 A1* | 9/2015 | White | G06N 20/00 | 706/12 |
| 2015/0356591 A1* | 12/2015 | Fano | G06N 20/00 | 705/14.27 |
| 2016/0019587 A1* | 1/2016 | Hueter | G06N 20/00 | 705/14.53 |
| 2016/0092913 A1* | 3/2016 | Crites | G06Q 30/0246 | 705/14.45 |
| 2016/0092925 A1* | 3/2016 | Crites | G06Q 30/0246 | 705/14.61 |
| 2016/0098735 A1* | 4/2016 | Sinha | G06Q 30/0202 | 705/7.31 |
| 2016/0210641 A1* | 7/2016 | Chittilappilly | G06Q 30/0201 | |
| 2016/0210656 A1* | 7/2016 | Chittilappilly | G06Q 30/0246 | |
| 2016/0210658 A1* | 7/2016 | Chittilappilly | G06Q 30/0204 | |
| 2016/0210661 A1* | 7/2016 | Chittilappilly | G06Q 30/0246 | |
| 2016/0267519 A1* | 9/2016 | Pai | G06Q 30/0275 | |
| 2016/0267523 A1* | 9/2016 | Biswas | G06Q 30/0244 | |
| 2016/0364647 A1* | 12/2016 | Achin | G06N 5/02 | |
| 2017/0061286 A1* | 3/2017 | Kumar | G06Q 30/0269 | |
| 2017/0213237 A1* | 7/2017 | Yadagiri | G06Q 10/067 | |
| 2017/0300939 A1* | 10/2017 | Chittilappilly | G06N 20/00 | |
| 2018/0060744 A1* | 3/2018 | Achin | G06N 20/00 | |
| 2018/0192128 A1* | 7/2018 | Manus | H04N 21/44222 | |
| 2018/0270544 A1* | 9/2018 | Ray | G06Q 30/0264 | |
| 2018/0300737 A1* | 10/2018 | Bledsoe | G06Q 30/0202 | |
| 2019/0213476 A1* | 7/2019 | Singh | G06N 3/0445 | |

OTHER PUBLICATIONS

Method for Interpreting Conversion Path Performance From Upper-Funnel Interactions; Neil Hoyne, IPCOM000250860D IP.com Electronic Publication Date: Sep. 11, 2017.*

* cited by examiner

BRAND A

TOTAL ESTIMATION                 NUMBER OF obs  =  48,136

| | TOTAL | STD. ERR. | [95% CONF. | INTERVAL] |
|---|---|---|---|---|
| 500 — QUANTITY | 482343.3 | 1565.702 | 479274.5 | 485412.1 |
| future_quantity | 476486.2 | 1204.653 | 474125.1 | 478847.4 |

BRAND B

TOTAL ESTIMATION                 NUMBER OF obs  =  90,902

| | TOTAL | STD. ERR. | [95% CONF. | INTERVAL] |
|---|---|---|---|---|
| 502 — QUANTITY | 874421 | 1029.119 | 872403.9 | 876438.1 |
| future_quantity | 865415.7 | 709.98 | 864024.2 | 866807.3 |

FIG. 5

BRAND A
QUANTITY

| | PERCENTILES | SMALLEST | | |
|---|---|---|---|---|
| 1% | 1.9 | 1.87 | | |
| 5% | 2.05 | 1.87 | | |
| 10% | 2.05 | 1.87 | Obs | 261,608 |
| 25% | 7.25 | 1.87 | SUM OF WGT. | 261,608 |
| 50% | 7.25 | | MEAN | 10.19071 |
| | | LARGEST | STD. DEV. | 7.51398 |
| 75% | 14 | 76.6 | | |
| 90% | 14.5 | 80.7 | VARIANCE | 56.4599 |
| 95% | 29 | 108.75 | SKEWNESS | 2.071757 |
| 99% | 36.25 | 108.75 | KURTOSIS | 8.303397 |

TOTAL ESTIMATION  NUMBER OF obs = 48,136

| | TOTAL | STD. ERR. | [95% CONF. INTERVAL] | |
|---|---|---|---|---|
| first_purchase_quantity | 502539.8 | 0 | - | - |
| 600 — QUANTITY | 478991.2 | 1545.791 | 475961.5 | 482021 |

BRAND B
QUANTITY

| | PERCENTILES | SMALLEST | | |
|---|---|---|---|---|
| 1% | 8 | 1 | | |
| 5% | 8 | 1 | | |
| 10% | 8 | 1 | Obs | 451,929 |
| 25% | 8 | 1 | SUM OF WGT. | 451,929 |
| 50% | 8 | | MEAN | 8.657339 |
| | | LARGEST | STD. DEV. | 2.159124 |
| 75% | 8 | 47.5 | | |
| 90% | 11.5 | 47.5 | VARIANCE | 4.661815 |
| 95% | 12 | 48 | SKEWNESS | 4.191276 |
| 99% | 16 | 108 | KURTOSIS | 33.31176 |

TOTAL ESTIMATION  NUMBER OF obs = 90,902

| | TOTAL | STD. ERR. | [95% CONF. INTERVAL] | |
|---|---|---|---|---|
| first_purchase_quantity | 809027.8 | 0 | - | - |
| 602 — QUANTITY | 855317 | 942.3495 | 853470 | 857164 |

FIG. 6

| AD CAMPAIGN | WEEKLY SPEND: ACTUAL | WEEKLY SPEND: MODEL RECOMMENDED | BUDGET CHANGE |
|---|---|---|---|
| A | $14,578 | $4,723 | -67.6% |
| B | $13,569 | $14,050 | 3.5% |
| C | $8,423 | $19,183 | 119.9% |
| D | $15,461 | $14,075 | -9.0% |
| TOTAL BUDGET | $52,031 | $52,031 | |

FIG. 8

METHOD AND SYSTEM TO ACCOUNT FOR TIMING AND QUANTITY PURCHASED IN ATTRIBUTION MODELS IN ADVERTISING

FIELD OF THE INVENTION

This invention relates generally to techniques for measuring media effectiveness in advertising. More particularly, it relates to data-driven attribution models where the conversion event is a purchase with an associated quantity, e.g., volume. For example, for a consumer who ultimately exhibits a desired action, e.g., a product purchase or subscription, it relates to accounting for external factors and other marketing efforts while assigning credit to media events so the effect of the media touchpoints is accurately described and measured in units meaningful to an advertiser or media teams.

BACKGROUND OF THE INVENTION

Statistically-driven attribution models make it possible to understand which media touchpoints are most effective in driving conversions, in order to more efficiently allocate media budgets and maximize return on media investment. This invention discloses a specific area of variables in attribution models that account for (1) the timing of the purchase occasion; and (2) a prediction of the quantity purchased during the purchase occasion. Such an approach is commonly known as a two-stage model. The solution for the timing of purchase occasions has already been addressed in a previous patent, Haynes et al., 2016, U.S. patent application Ser. No. 15/097,969, which is incorporated herein by reference.

BRIEF SUMMARY OF THE INVENTION

Attribution approaches initially developed within the online digital ad space. In the late-1990's, it was typical for the "last click" on a display or search ad to receive 100% of the "credit" for any visitor who ultimately "converted", which might mean any range of actions from a site visit to a purchase. However, by the mid-2000's, many agencies and ad technology vendors recognized that other marketing events in a consumer's exposure path should also potentially receive credit for contributing to online conversions. Initially, these models were "rule-based", where position or order in a sequence, such as first click or last click, received some fixed proportion of a conversion credit. However, these rule-based models did a poor job of separating correlation from causality. They also required a domain expert to decide how to assign fractional credit within paths, did not properly credit tactics that disproportionately appeared in conversion paths, and did not properly account for cross-channel interactions and the value of prospecting versus converting media. For all these reasons, by 2012, the industry had largely recognized the need to apply "statistically-driven" attribution models, ranging from Bayesian Hierarchical Shrinkage (employed by Google 360, formerly Adometry) to linear discriminant analysis (employed by Visual IQ) to bagged logistic regression (employed by Turn).

Price is generally considered to be one of the most important levers that marketers can pull to generate more sales. It is one of the fundamental "Four P's" of marketing: Product, Place, Price, and Promotion. Once the product and place are established, price and promotion (advertising) are the two main areas left to drive sales, especially in low-involvement, high repeat-purchase cycle industries. Frequently, advertising consists of digital (e.g., Internet) and TV campaigns, as well as price discounts and coupons simultaneously. If simultaneous price variations are not taken into account, the effectiveness of the media touchpoints is overestimated. Therefore, price is, or can be, an important aspect of attribution modeling. In addition to price, it may be desirable to account for other, non-media variables. These may include, but are not limited to, seasonality and repeat purchasers. Accounting for these also allows a more accurate assessment of attribution for the consumer who would have purchased the product regardless of paid media exposure.

In spite of the importance of price variation, seasonality, repeat purchase cycles and quantity in the purchase decision, the attribution modeling approaches employed by most vendors today do not account for quantity in their models for two main reasons. First, most attribution vendors provide out-of-the-box solutions with minimal or no customizable model variables. Their current solutions do not allow the determination of the specific quantity purchase patterns for their clients. The second reason is because they do not have the data—either they do not have sales data, or they are unable to link it to the other data sources for attribution, such as media touchpoints. Their conversion events are other proxies for purchases, such as "clicks".

With regard to the quantities purchased by individual consumers, descriptive statistics—such as an individual's or household's quantity dispersion profile, i.e., standard deviation, can be employed to help guide the model selection for the second step of the two-stage model. As an example, in the consumer packaged goods (CPG) industry, buying patterns are typically tightly dispersed. There is frequently low variation in product packaging, and households often repeatedly buy the same quantity of the specific product across purchase occasions. This allows the use of simple, computationally efficient regression approaches, such as linear regression models. In the case of a household that has not purchased the CPG brand before—i.e., a non-repeat purchaser—the average quantity of those households that did purchase (or repeat purchasers) may be used. The resulting forecast is reliable due to the aggregate purchase patterns being tightly dispersed.

The external validity of the two-stage model can be tested by applying the AFT Survival Model coefficients tuned on a training data set to a test data set (or holdout sample), to address the timing of purchase events. Thereafter, the linear regression model addresses the quantity the consumer will purchase. Tracking the actual purchase quantity versus the predicted purchase quantity based on past periods every time the model is run permits the monitoring of model fitness on an ongoing basis. New paths are scored every time the model is run. The model should be re-specified if it loses predictive power, defined here as the difference between predicted and actual conversions for an out-of-sample period falling outside +/−15%.

BRIEF DESCRIPTION OF THE DRAWINGS

FIG. 5 contains summary statistics of purchase quantity forecasts for repeat purchasers of two brands;

FIG. 6 contains summary statistics of purchase quantity forecasts for non-repeat purchasers of two brands;

DETAILED DESCRIPTION OF THE INVENTION

While the following detailed description contains many specifics for the purposes of illustration, those of ordinary skill in the art will recognize that many variations and alterations to the following details are possible within the scope of the exemplary embodiments of the disclosed system and methods.

Figure 1:
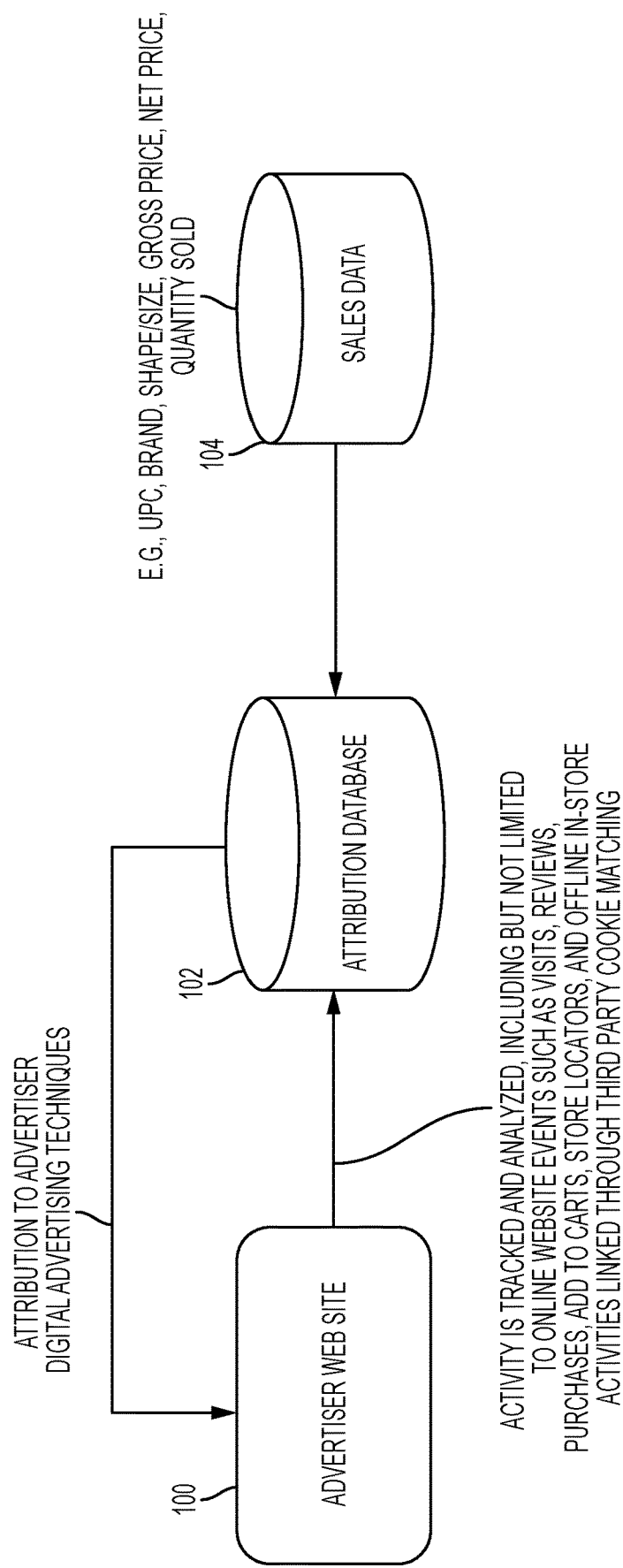
FIG. 1 is a diagram of the computer infrastructure that may be used in an embodiment of the invention.
Figure 2:
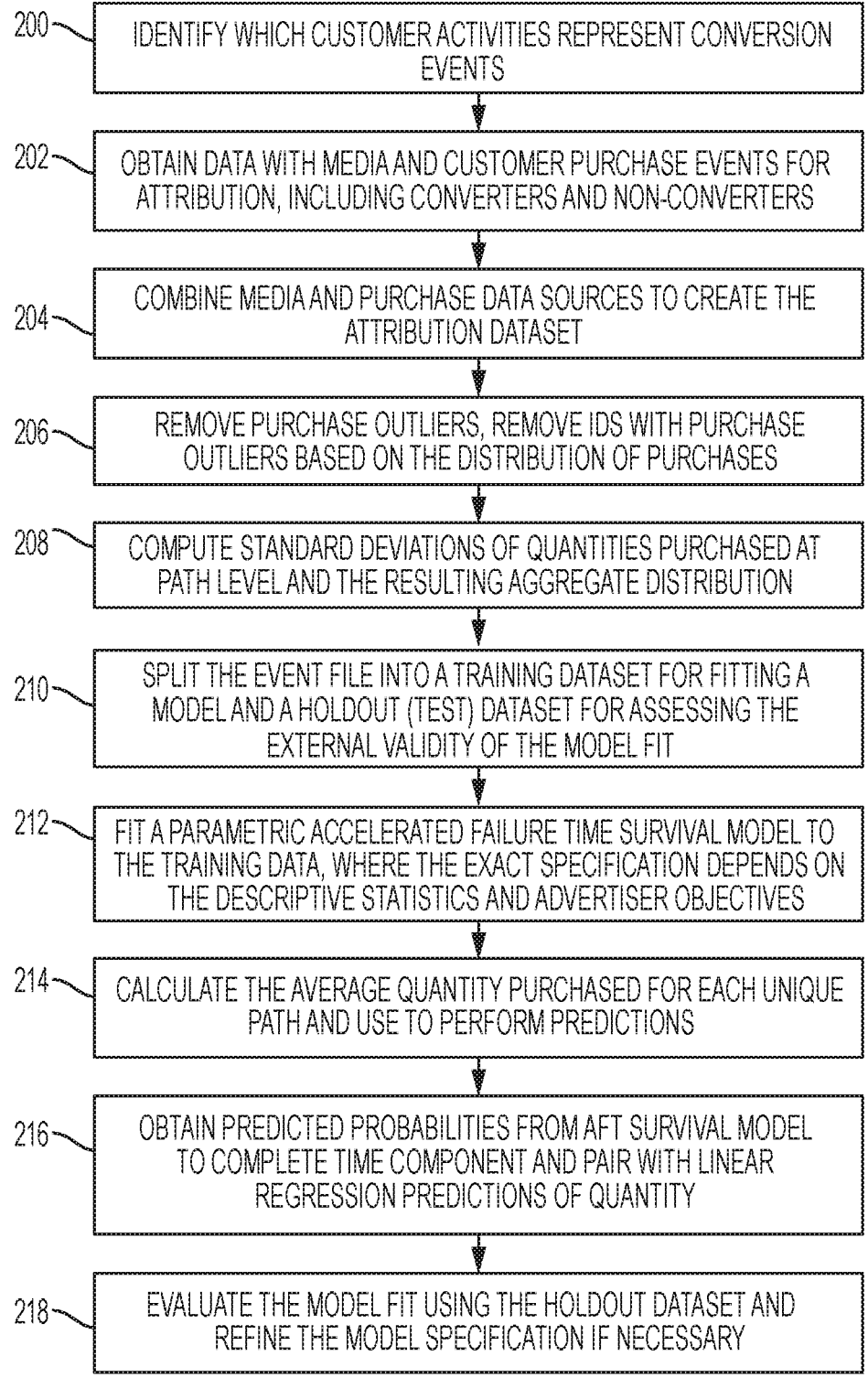
FIG. 2 is a process flow of one embodiment of the invention.

FIG. 1 illustrates a basic data infrastructure to collect, bind, analyze, and model data. Regarding the link from an advertiser website (100) to an attribution database (102), activity is tracked and analyzed, including but not limited to online website events such as visits, reviews, purchases, add to carts, store locators, and offline in-store activities linked through third party cookie matching. In order to account for quantity (e.g., units, volume, length, number of phone lines, etc.), the attribution database may also comprise sales data (104). The data can be linked and modeled in the attribution database.

One exemplary embodiment is a computer-implemented method for including consumer quantity purchased in an attribution model in an advertising environment. The method includes executing program instructions by at least one processor, causing the processor to calculate various quantity variation metrics and adding them into an attribution dataset, and then fitting a regression model to forecast the quantity involved in the consumer purchase decision.

A conversion event is defined as an outcome desired by the advertiser that has a purchase quantity and some variation in the quantity. Conversion events may include, for example, purchasing an item or services at a physical store or online, registering for an online service, or signing up for a subscription or service.

Media exposure events belong to either a paid media channel or unpaid media channel. Examples of paid media channels include: online digital display advertising; online paid search (SEM); paid social; addressable television; and content delivery (e.g., email). Examples of unpaid media channels include organic (natural), search (SEO), or direct to website (i.e., organic web site).

Figure 3:
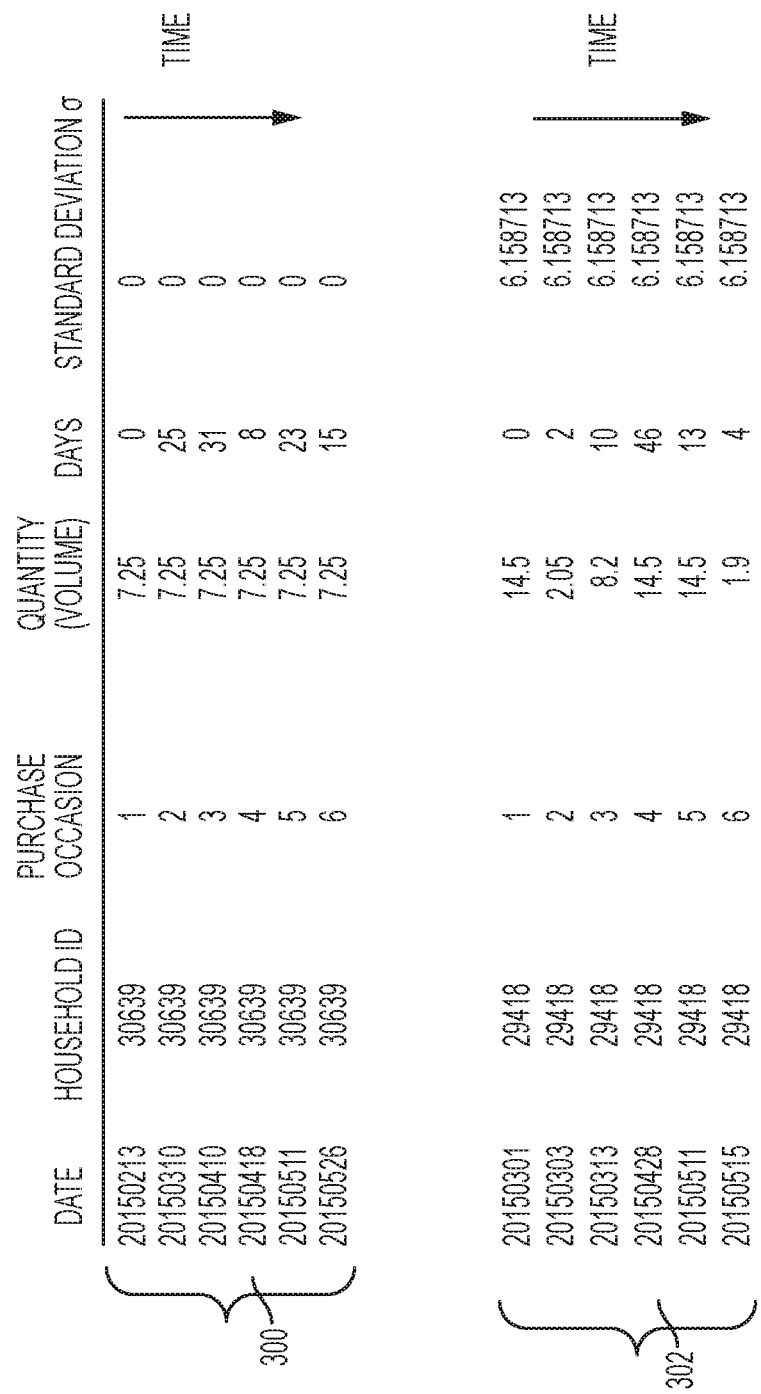
FIG. 3 is an illustration of quantity, in volume, purchased for two anonymous households.

The descriptive statistics of quantity purchased—central to guiding forecast model selection—are calculated along the household (path) level, and summarized across the sample dataset. For example, the standard deviation is computed for each household's purchase history. FIG. 3 illustrates two path-level purchase patterns, comprising low-dispersion (300) and high-dispersion households (302), both of whom are repeat purchasers. The dispersion σ is explicitly calculated as $$\sigma = \sqrt{\frac{1}{N}\sum_{i=1}^{N} x_i^2 - \bar{x}^2};$$

where N is the sample size and $x_i$ represents the household quantities purchased. When σ is a small value, one can apply a linear regression, Y=a+bx, where x is the explanatory variable (quantity) and Y is the dependent variable, and will result in a high value of $R^2$, the goodness of fit.

The calculated quantity variation metrics are tracked continually to determine if the linear regression model needs to be re-specified, e.g., if $R^2<0.60$. An attribution model of choice is fit on the model dataset with at least one quantity prediction metric included.

In addition, the above-described embodiment could include calculating the quantity variation metrics on a quantity that is the total of some number other than quantity sold, which may include but is not limited to number of items, volume, weight, or length.

In addition, the above-described embodiments could include removing data outliers based on quantity purchased using criteria which may include but is not limited to confidence intervals, percentiles, or numerical thresholds.

In addition, the above-described embodiments could further include removing outliers in the calculated metrics according to criteria that include but are not limited to confidence intervals, percentiles, or numerical thresholds. Dimensions without quantity variation are assigned a value of 0.

The embodiments may also include:

identifying which consumer activities represent purchase-type conversion events for which quantity variation needs to be measured;

obtaining data with media and consumer action events for attribution, including converters and non-converters;

combining data sources to create the attribution dataset;

removing purchase quantity outliers and/or household ids with purchase outliers based on the distribution of purchases;

using the purchase data, calculating the quantity variation metrics along the dimensions of interest;

removing outliers in the quantity variation metrics based on the distribution of these metrics and/or their significance;

adding the calculated quantity variation metrics along each dimension as variables in the attribution dataset.

Consistent with the present invention, there are other ways this method can be adapted or altered for various purposes. Referring to FIGS. 2, 3, 4, 5, 6, 7 and 8:

Initial Requirements:

The first step 200 for running attribution is identifying which household activities represent conversion events (e.g., online or offline purchase, visit a store locator webpage, add an item to a cart, request a quote, etc.). Once conversion event(s) are identified, all relevant and available data sources which could be useful for understanding conversion behavior are examined. These usually include web server, ad server, CRM, purchase data, and/or other media log files, which can be merged together into one data set (step 202). Depending on what data sources and conversion types are included, this is possible using cross log file tagging, implementing a container tag, and/or working with 3rd party user id matching partners.

The next step 204 is to merge the data sources into one dataset. The method for doing so depends largely on the type of modeling being used, and may already be linked by the data vendor, or through partnering with tagging companies. The end result is usually (but not always) a "path" for each unique household with timestamped media touchpoints and conversion events.

The purchase events are the only data points used in the calculation of the quantity variation metrics and subsequent model. Depending on the source(s) of the purchase data, there may be data anomalies, negative sales due to returns, or extremely large purchase quantities by resellers, so the next step 206 is to remove these outliers from the purchase data. In this case, outliers are selected to be those with a sales quantity above five σ.

Once the outliers are removed, the quantity dispersions σ themselves are calculated for each unique path (step 208).

Attribution requires a large amount of data. As shown at step 210, the event file is split into a training dataset and a testing dataset. The zipped raw digital log files can often be larger than a hundred gigabytes per month. A training data set (which is unzipped) is usually a few hundred gigabytes for all unique identifiers in a time period. A small portion of the paths from the training dataset are held out for later testing external validity of the two-stage model in a test data set.

The parametric accelerated failure time (AFT) survival specification is used since media data usually does not meet the proportional hazards (PH) assumption required by semi-parametric and parametric PH survival model specifications. The underlying distribution that best fits the data for a specific advertiser is selected. Weibull, Log-Logistic, and Generalized Gamma distributions are the most commonly employed and are fit using Maximum-Likelihood Estimation (MLE). The Log-Logistic distribution is often especially well-suited to media data as it balances computational feasibility, a flexible functional form for ongoing automation where the effect of time might change, and is among specifications which well fit the data (step 212).

Finally, the average quantities purchased in the training dataset are calculated and put into the linear regression forecast model (step 214). Predicted probabilities from the AFT survival model are computed in order to assess the time of purchase, and paired with the linear regression quantity predictions (step 216). Model fit is assessed by computing the percent difference in forecasted quantity using the training dataset versus the actual purchase quantity in the test dataset (step 218).

In order to guide forecast model selection, FIG. 3 shows two examples of repeat purchasers of Brand A with zero σ (300) and high σ (302), when computing along the dimension of time.

Figure 4:
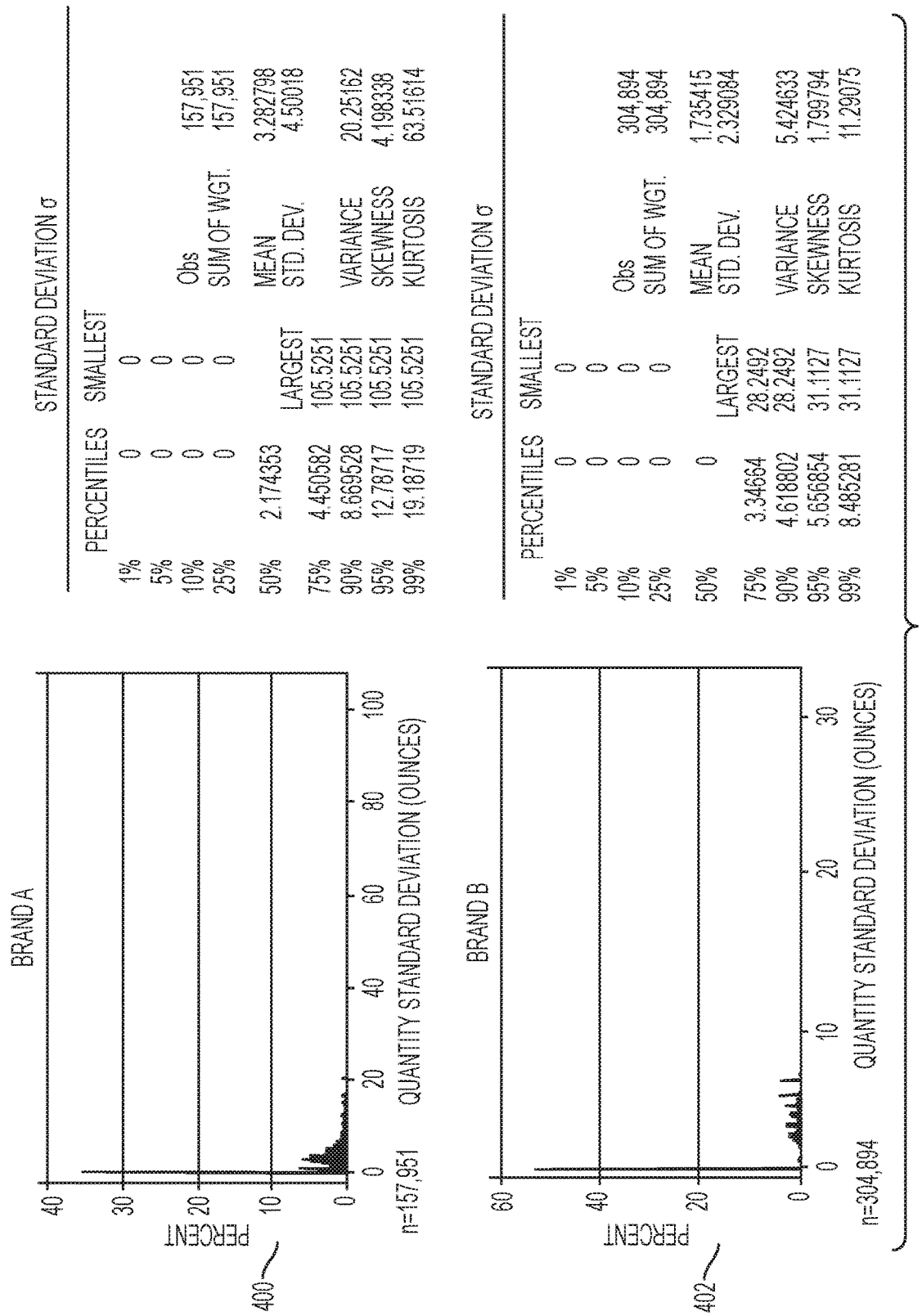
FIG. 4 is a representation of standard deviations of quantity for two brands.

FIG. 4 shows descriptive statistics for two CPG Brands A and B. Aggregating all path-level σ calculations from FIG. 3 results in zero σ for 35% of Brand A (400), and 54% for Brand B (402). Such statistics indicate that a simple linear regression model will likely have a suitable goodness of fit.

FIG. 5 displays a summation of values for repeat purchasers at the path level for Brand A (500) and Brand B (502). For Brand A, all 48,136 multi-purchase paths are selected, with the endpoints being held out for a linear regression forecast of volume. For Brand B, 90,902 purchase paths are available for forecasting. In cross-validation, Brand A's total forecast is 476,486 units versus 482,343 actual units, a 1.21% error. Brand B's results are 865,415 units forecast versus 874,421 actual units, a 1.03% error.

For non-repeat purchasers, there is no data on which to perform linear regression. Therefore, the average quantities purchased by repeat purchasers for Brands A and B are used as a proxy forecast. FIG. 6 displays an aggregation of forecasted quantities for Brand A (600) and Brand B (602). Brand A, containing 261,608 forecasts, results in predicted units of 502,539 versus actual of 478,991, a 4.69% error. Brand B, containing 451,929 forecasts, results in 809,027 forecast versus 855,317 actual, a 5.72% error. In order to prevent "look-ahead" bias, average units are calculated on the same time intervals as the previous year. Pairing these predicted purchase quantities with predicted probabilities from the AFT Survival Model brings in the purchase timing of the forecast, and closes the loop on the two-stage model.

Figure 7:
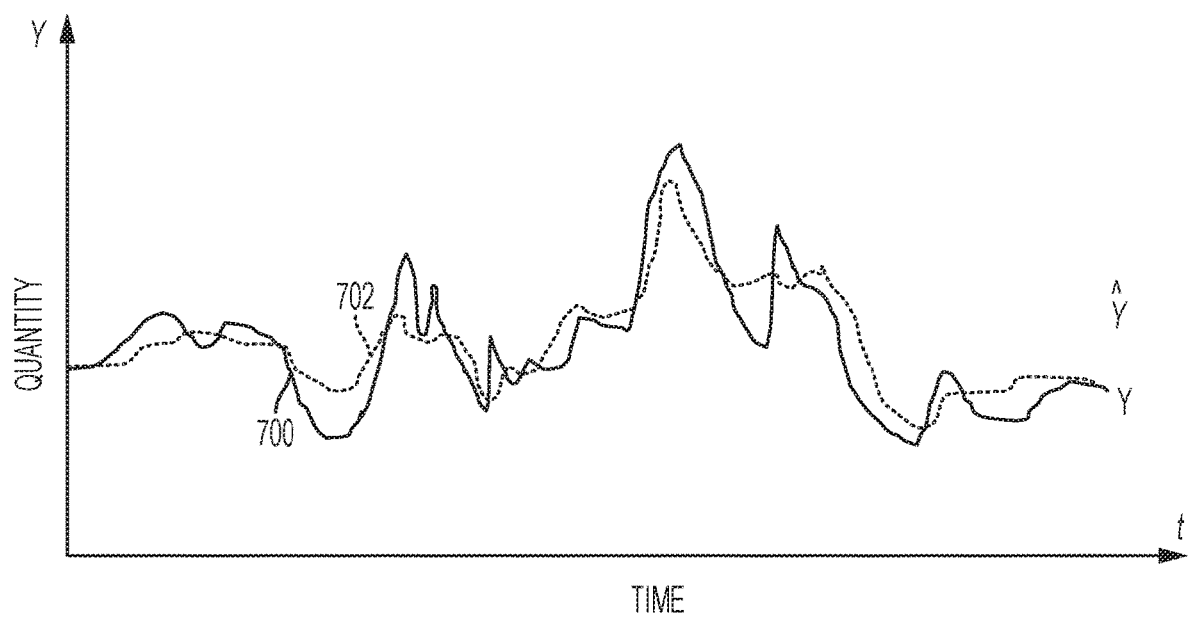
FIG. 7 is an illustration of actual versus predicted quantity for a brand; and, FIG. 8 is an illustration of a spreadsheet that can be output from the model for uploading into a programmatic ad-buying platform.

FIG. 7 is an example six-month forecast of actual purchased quantities of Brand B, Y (700), versus the two-stage model forecasts, $\hat{Y}$ (702). The errors between the predicted and actual purchase quantities are continuously computed and result in an error range of 1.3% to 13.6%. The model should be re-specified if it loses predictive power, defined here as the difference between predicted and actual purchase quantities falling outside a +/−15% range. This range is derived from domain expertise from media teams and advertisers.

FIG. 8 shows a spreadsheet that can be output from the model and uploaded into a programmatic ad-buying platform. In this example, the optimal model allocates budget among four campaigns, labeled A, B, C, and D. Past weekly spend is shown in the second column. Based on the model's predictive variables, next week's proposed spend is shown in the third column. Adjustments to spend based on the model output should lead to a sales lift and an increase in ROI. The percent change in spend, week-over-week, is shown in the fourth column. To build this activation plan, consistent with the description explained in Haynes et al., 2016, U.S. patent application Ser. No. 15/097,969, model coefficients obtained at step 212 are used to assign fractional credit to events in converting paths for their contribution towards driving a conversion. Response curves are created at step 214 for media coefficients from the parametric accelerated failure time survival model, based on fractional credit assignments and cost data over time. All of these curves are used together to construct a scenario plan where it is possible to make optimization recommendations. Such optimizations are generally constrained, i.e., the total amount of spend cannot go up or down. The total budget before and after model adjustments is shown in the bottom row to ensure the constrained optimization is satisfied. The programmatic buying platform is configured to strip out the campaign label in the first column and the new spend in the third column, for activation.

The inventors also considered a "competing risk" survival model, which is useful for situations with multiple types of conversion events, e.g., varying quantities purchased by a consumer. This specification is appropriate if there are independent causal mechanisms operating in parallel; i.e., each discretized outcome may be non-informative for the others. However, this setup is ill-specified for our case, since: (1) purchase visits are not independent, and (2) there is good reason to believe there is one process that governs if/when someone is a purchaser and another that governs the volume purchased. For this situation, it may be advantageous to estimate one model for the timing of events and a second for the type of event (quantity level).

We claim:
1. A computer-implemented method for accounting for the timing of and quantity of consumers' purchases in attribution models, the method comprising:
   identifying consumer activities that represent purchase events with quantity variation;
   obtaining media event data and consumer action data;
   merging the media event data and consumer action data to create an attribution dataset, the attribution dataset including a path to a purchase event including time-stamped media touchpoints and one or more of tracked consumer activity and conversion events;

calculating a quantity variation metric based on purchase data along at least one dimension of interest;

splitting the attribution dataset into a training portion and a testing portion;

fitting an attribution model on the training portion based on the quantity variation metric and a forecasted variation metric produced using the attribution model;

determining accuracy of the attribution model using the testing portion by assessing a difference between the forecasted variation metric and the quantity variation metric;

re-fitting the attribution model if the difference between the forecasted quantity variation metric and the quantity variation metric exceeds a threshold; and using the attribution model to forecast purchased quantities and generate a recommended media campaign budget.

2. The method of claim 1, wherein the at least one dimension of interest comprises an individual.

3. The method of claim 1, wherein the at least one dimension comprises a household.

4. The method of claim 1, wherein the at least one dimension comprises a product.

5. The method of claim 1, wherein the at least one dimension comprises a timeframe.

6. The method of claim 1, wherein the at least one dimension comprises a combination of at least two dimensions.

7. The method of claim 1, further comprising removing outliers in the purchase data based on their distribution.

8. The method of claim 1, further comprising removing outliers in at least one calculated metric.

9. The method of claim 7, wherein the removing outliers is done according to criteria comprising confidence intervals, percentiles, or numerical thresholds.

10. The method of claim 7, wherein the removing outliers is based on a distribution of quantity variation metrics or their significance.

11. The method of claim 1, wherein the fitting the attribution model on the attribution dataset includes using an accelerated failure time survival model.

12. The method of claim 1, wherein the attribution model includes a linear regression forecast model.

13. The method of claim 1, wherein
the media campaign budget includes a plurality of campaigns, and
the generated recommended media campaign budget includes changing a proportion of spend on the respective campaigns.

* * * * *